(12) United States Patent
Frisch

(10) Patent No.: US 10,484,086 B2
(45) Date of Patent: Nov. 19, 2019

(54) OPTICAL BRANCHING UNIT

(71) Applicant: Neptune Subsea IP Limited, London (GB)

(72) Inventor: David Antony Frisch, Ashbourne (GB)

(73) Assignee: Neptune Subsea IP Limited, London (GB)

( * ) Notice: Subject to any disclaimer, the term of this patent is extended or adjusted under 35 U.S.C. 154(b) by 0 days.

(21) Appl. No.: 15/992,458

(22) Filed: May 30, 2018

(65) Prior Publication Data
US 2018/0278326 A1 Sep. 27, 2018

Related U.S. Application Data

(63) Continuation of application No. PCT/GB2016/053800, filed on Dec. 2, 2016.

(30) Foreign Application Priority Data

Dec. 4, 2015 (EP) .................................. 15198113

(51) Int. Cl.
*G02F 1/00* (2006.01)
*H04B 10/038* (2013.01)
(Continued)

(52) U.S. Cl.
CPC ......... *H04B 10/038* (2013.01); *G02B 6/3562* (2013.01); *H04B 10/2504* (2013.01);
(Continued)

(58) Field of Classification Search
CPC .. H04B 10/038; H04B 10/2504; H04B 10/80; G02B 6/3562; H04J 14/0201; H04Q 11/0062; H04Q 2011/0081
(Continued)

(56) References Cited

U.S. PATENT DOCUMENTS 5,838,477 A * 11/1998 Yamamoto ......... G02B 6/12007
398/105
6,038,046 A * 3/2000 Kaneko ............... H04J 14/0201
398/1

FOREIGN PATENT DOCUMENTS

EP 1 202 595 A1 * 10/2000 ............. H04Q 11/00
EP 2753011 A1 7/2014

OTHER PUBLICATIONS

Extended European Search Report dated Jun. 24, 2016 in connection with European Patent Application No. 15198113, 8 pages.
(Continued)

*Primary Examiner* — Mohammad R Sedighian

(57) ABSTRACT

An optical communications apparatus includes a branching unit and a switching module. The branching unit is configured to be connected to first, second, and third optical cables each including an optical fiber. The branching unit includes a branch optical path configured to route a fixed pre-determined range of wavelengths that are input to the branching unit from the optical fiber of the first cable to the optical fiber of the third cable. The switching module includes at least one optical switch having a bypass configuration and a branch connecting configuration. In the bypass configuration, a connection via the branch optical path to a distal portion of the third cable is bypassed. In the branch connecting configuration, the branch optical path is enabled so that the pre-determined range of wavelengths that are input to the branching unit are routed to the optical fiber of the distal portion of the third cable.

21 Claims, 8 Drawing Sheets

(51) Int. Cl.
  *G02B 6/35*    (2006.01)
  *H04J 14/02*   (2006.01)
  *H04B 10/25*   (2013.01)
  *H04B 10/80*   (2013.01)
  *H04Q 11/00*   (2006.01)

(52) U.S. Cl.
  CPC .......... *H04B 10/80* (2013.01); *H04J 14/0201* (2013.01); *H04Q 11/0062* (2013.01); *H04Q 2011/0081* (2013.01)

(58) Field of Classification Search
  USPC .......................................................... 398/2
  See application file for complete search history.

(56) References Cited

OTHER PUBLICATIONS

International Search Report dated Mar. 30, 2017 in connection with International Patent Application No. PCT/GB2016/053800, 4 pages.
Written Opinion of the International Searching Authority dated Mar. 30, 2017 in connection with International Patent Application No. PCT/GB2016/053800, 6 pages.

* cited by examiner

OPTICAL BRANCHING UNIT

CROSS-REFERENCE TO RELATED APPLICATIONS AND PRIORITY CLAIM

This application claims priority as a continuation of International Patent Application No. PCT/GB2016/053800 filed on Dec. 2, 2016, which claims priority to European Patent Application No. EP15198113.1 filed on Dec. 4, 2015. Both of these applications are hereby incorporated by reference in their entirety.

TECHNICAL FIELD

The present invention relates to an optical branching unit and associated system, and more specifically to a submarine optical branching unit.

BACKGROUND

Branching units are units that connect three cables (e.g. three submarine cables). In general terms, a branching unit may provide a connection between a first location and second location, at the same time as connecting the first and second locations to a third location via a branch connection. Traffic between the first location and the second location is typically carried by a first range of wavelengths, and traffic to or from the third location (from either the first or second location) is carried by a second (different) range of wavelengths.

In general, it is desirable for branching units to be highly reliable, because recovering a branching unit for maintenance is made complicated and difficult by the three cables (and generally requires a complex marine operation). Complexity in a branching unit should therefore be kept to a minimum. It is also desirable that branching units provide for flexibility in spectral allocation (e.g. the allocation of channels in a wavelength division multiplexed system) between each of the first, second and third locations, so that traffic through the branching unit can be more optimally allocated spectrum/channels. For simplicity, the discussion of branching units herein will concentrate on a single fiber and direction of transmission for simplicity, but it will be appreciated that similar principles are applicable to branching units with a plurality of fibers, and for bi-directional communication (whether by separate fibers or in a single fiber).

In some branching units, which may be referred to as "fiber-drop" branching units, one or more fiber pairs are diverted to provide connectivity between the first and third locations. With this approach, traffic between the first and second locations must be routed through the third location, which causes a number of potential problems. A break in the cable between the branching unit and the third location can disrupt the flow of traffic between the first and second locations (or other branch points after the third location).

An alternative form of branching unit, that addresses some of these problems, may be referred to as an optical add drop multiplexing (OADM) branching unit. With this approach, traffic between the first location and the second location is again carried by a first range of wavelengths, and traffic to or from the third location (from either the first or second location) is carried by a second (different) range of wavelengths.

However, in an OADM branching unit, wavelength selective filters are used to divert (drop) only the second range of wavelengths to the third location from the first location, and to recombine (add) the second range of wavelengths from the third location to the second location. This addresses some of the problems with a fiber-drop branching unit, but can bring problems of its own.

Where fixed wavelength filters are used (which is presently typical to avoid concerns over reliability, complexity, and power consumption required for reconfigurable arrangements) the operator is committed to a fixed wavelength allocation for the branch traffic to or from the third location. Given the difficulties in forecasting traffic, there have been efforts to provide greater flexibility without too much complexity (complexity tending to have the drawback of negatively impacting both reliability and cost). One approach has been to site the wavelength selective filters in a box between the branching unit and the third location. This means that filters can be replaced more readily without interfering with the branching unit, which may require a difficult marine operation. Although recovering such a box is also disruptive, it is a simpler operation than recovering a branching unit (where, by definition, at least three cables meet).

Another way to improve flexibility is to use a "broadcast" branching unit. In this arrangement, an optical coupler within the branching unit routes all the wavelengths from the first location to both the second and third locations. A second coupler adds wavelengths from the third location to traffic destined for the second location. This adds flexibility, but the wavelengths added from the third location must be different from those present in the transmissions from the first location. Further branches each require an allocation of wavelengths that are not used in transmission from the first location or from any of the preceding branches. When several branches are used, this approach may become quite inefficient in allocating wavelengths.

SUMMARY

A solution to at least some of the above mentioned problems is desired.

According to a first aspect of the invention, there is provided an optical communications apparatus, comprising: a branching unit for connecting a first, second and third optical cable and a switching module. Each of the first, second and third optical cables comprises an optical fiber. The branching unit comprises a branch optical path arranged to route a fixed pre-determined range of signal wavelengths that are input to the branching unit from the optical fiber of the first cable to the optical fiber of the third optical cable. The switching module comprises at least one optical switch. The at least one optical switch has a bypass configuration in which a connection, via the branch optical path, to a distal portion of the third optical cable is bypassed, so that all signal wavelengths input to the branching unit from the optical fiber of the first cable are routed to the optical fiber of the second optical cable without first being routed through the connection to the distal portion of the third optical cable. The switching module also has a branch connecting configuration in which the branch optical path is enabled so that a fixed pre-determined range of signal wavelengths that are input to the branching unit from the optical fiber of the first cable are routed to the optical fiber of the distal portion of the third optical cable.

The term "proximal" means near to the branching unit, and the term "distal" means further from the branching unit.

The branching unit may comprise the switching module, and the at least one optical switch may be operable to bypass the entire third optical cable.

The switching module may be remote from the branching unit. The apparatus may comprise a proximal portion of the third optical cable connecting the switching module to the branching unit and the switching module may comprise a connection to the distal portion of the third optical cable.

Each of the at least one optical switch may comprise a wavelength insensitive optical switch.

The branch optical path may comprise a fiber-drop arrangement in which the fixed predetermined range of wavelengths comprises all the wavelengths input to the branching unit by the optical fiber of the first cable.

The branch optical path may comprises a wavelength-drop arrangement in which a wavelength selective filter is arranged to route the fixed pre-determined range of wavelengths that are input to the branching unit by the optical fiber of the first cable to the optical fiber of the third optical cable.

The switching module may comprise a bypass optical path. The at least one optical switch may comprise: a first optical switch operable to divert signals from the optical fiber of the first cable to the bypass optical path; and a second optical switch operable to add signals from the bypass optical path to the optical fiber of the second cable.

The switching module may comprise an electrical detector for detecting an electrical signal from the third optical cable, and the switching module may be responsive to the electrical detector.

The switching module may comprise an optical detector for detecting an optical signal from the third optical cable, and the switching module may be responsive to the optical detector.

According to a second aspect, there is provided a method of isolating a portion of a branch connection from a branching unit, comprising using the apparatus of the first aspect, wherein the branch connection comprises the third optical cable.

The method may further comprise detecting a break in the distal portion of the third cable, and operating the switching module to bypass the distal portion of the third cable.

Operating the switching module to bypass the distal portion of the third cable may comprise transmitting loading channels from the branch optical path to the optical fiber of the second optical cable.

The branch connection may comprise an add/drop box, for connecting the distal portion of the third optical cable to a proximal portion of the third optical cable, and the switching module may be maintained in the bypass configuration before connecting the distal portion of the third optical cable to the add/drop box.

The method may further comprise changing the configuration of the switching module after connection of the distal portion of the third optical cable so as to connect the distal portion of the third optical cable to the proximal portion of the third optical cable.

The branching unit may be a submarine branching unit. The second and third optical cables may be used to provide alternative landings from the branching unit to an on-shore location. The switching module may be used to control which of the second and third optical cables are used to land the signal from the branching unit to the on-shore location.

BRIEF DESCRIPTION OF THE DRAWINGS

Embodiments of the invention will now be described, with reference to the accompanying drawings, in which.

DETAILED DESCRIPTION

Figure 1:
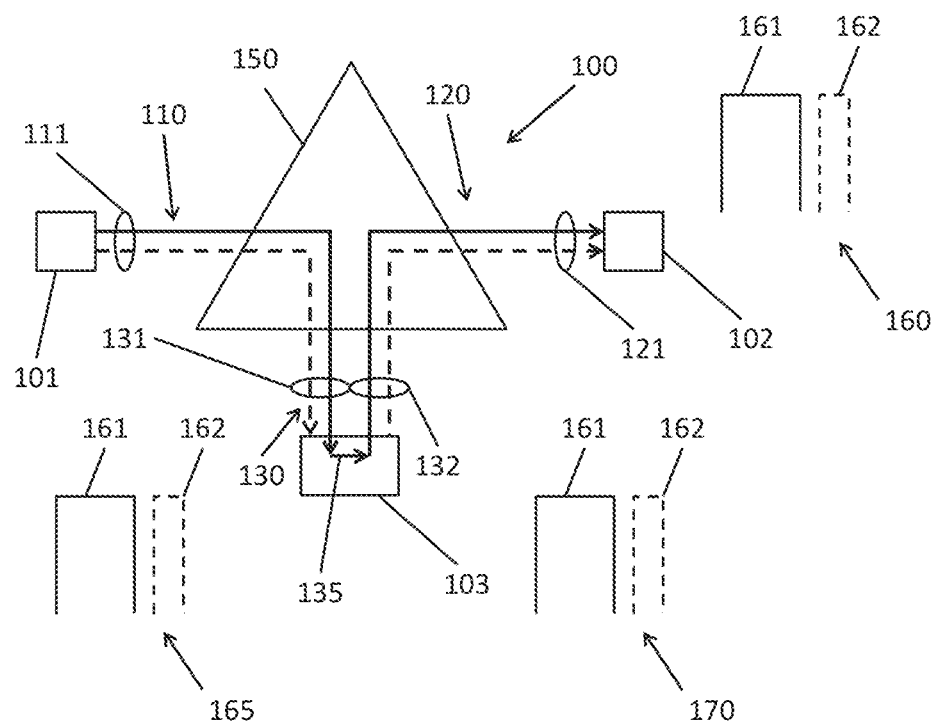
FIG. 1 is a schematic of a fiber drop branching unit.

Referring to FIG. 1, an optical apparatus 100 is shown, comprising: a branching unit 150; a first, second and third location 101, 102, 103; and first, second and third cables 110, 120, 130.

The first cable 110, second cable 120 and third cable 130 respectively connect each of the first location 101, second location 102 and third location 103 to the branching unit 150. Each of the first cable 110, second cable 120, and third cable 130 respectively comprise at least one optical fiber 111, 121 and 131, 132. Although a single fiber connection is generally depicted and discussed below, it will be understood that any of the optical cables 110, 120, 130 may comprise a plurality of cables, connected by the branching unit 150. Furthermore, although only a single direction of communication is sometimes shown for simplicity, it will be appreciated that embodiments include duplex communication (e.g. by separate fibers).

The spectrum (channels) 165 received at the third location and the spectrum (channels) 170 transmitted from the third location are indicated, along with the spectrum 160 received at the second location 102.

The optical fiber 111 carries a first range of wavelengths (e.g. a set of at least one channel), indicated by a solid line 161, and a second range of wavelengths, indicated by a dashed line 162. The first range of wavelengths 161 are allocated for communication from the first location 101 to the second location 102. The second range of wavelengths 162 are allocated for communication from the first location 101 to the third location 103, and from the third location to the second location 102.

The branching unit 150 diverts the optical fiber 111 of the first optical cable 110 into the third optical cable 130, as optical fiber 131. All signals entering the branching unit 150, regardless of their wavelength, are therefore routed to the entire third optical cable 130, and then to the third location 103. The spectrum (e.g. channels) received at the third location 165 includes the first and second range of wavelengths 161, 162 and the spectrum transmitted from the third location 165 comprises the first and second wavelengths 161, 162. The first range of wavelengths 161 may be passed through a loop connection 135 at the third location 103.

This means that all traffic (including the first wavelength range 161) from the first location 101 to the second location 102 is routed via the third location 103. A break in the third cable 130, between the branching unit 150 and the third location 103 can therefore disrupt the flow of communications traffic between the first and second locations 101, 102, or to other branch locations (not shown) after the third location 103.

Figure 2:
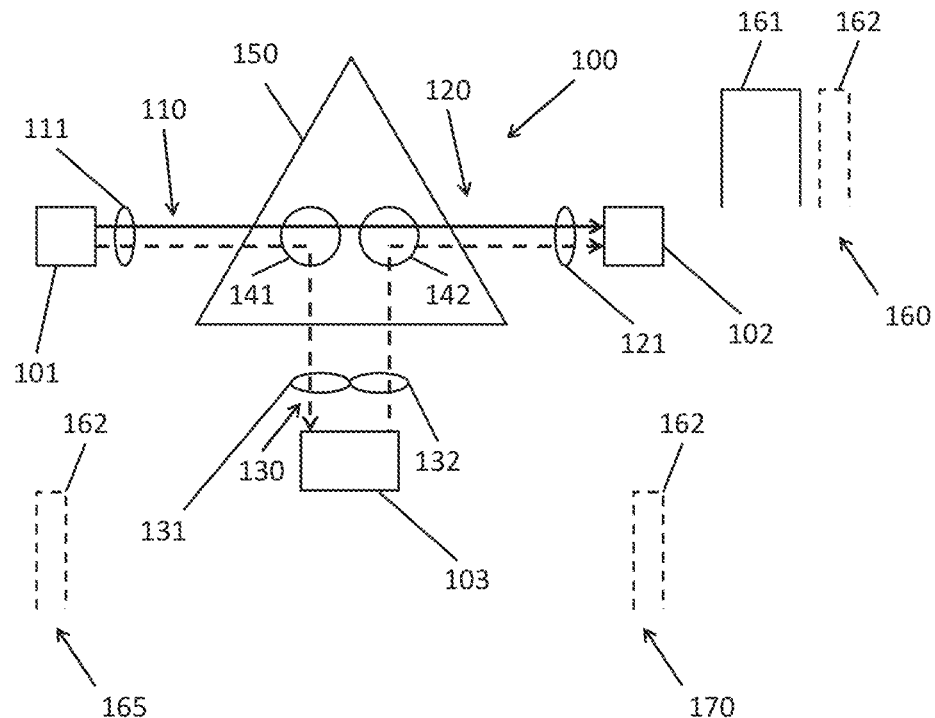
FIG. 2 is a schematic of an optical add-drop multiplexer (OADM) branching unit.

FIG. 2 shows an OADM branching unit 150, in which like reference numerals are used to depict like features to those shown in FIG. 1. The OADM branching unit of FIG. 2 uses a "drop" filter 141 (a fixed wavelength selective filter) to route only the second range of wavelengths 162 carried by the optical fiber 111 of the first cable 110 to the optical fiber 131 of the third cable 130 (and thence to the third location 103). A further "add" filter 142 (a fixed wavelength selective filter) is used to add the second range of wavelengths back into the optical fiber 121 of the second optical cable for communication from the third location 103 to the second location 102.

As already noted, the fixed add/drop filters 141, 142 offer no flexibility, and the operator is committed to a fixed allocation of spectrum/channels for each communication route. Although reconfigurable add drop multiplexers (ROADM) arrangements are known, these add significant complexity and their reliability is not yet sufficiently well established for widespread adoption.

Given the difficulties of forecasting traffic over the lifetime of a communications system, there have been efforts to provide greater flexibility without too much complexity. One approach is to site the add/drop filters remotely from the branching unit, for instance in a box between the branching unit and the third location.

Figure 3:
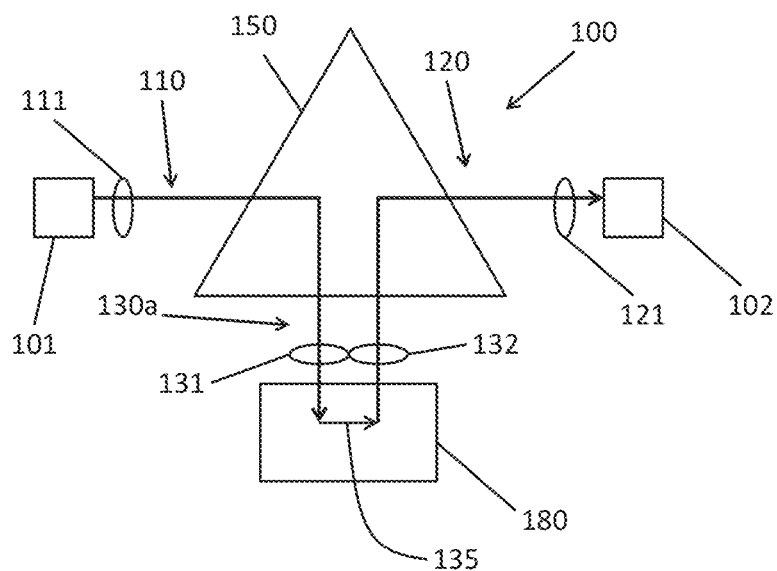
FIG. 3 is a schematic of a branching unit with a remote box comprising a loop connector.
Figure 4:
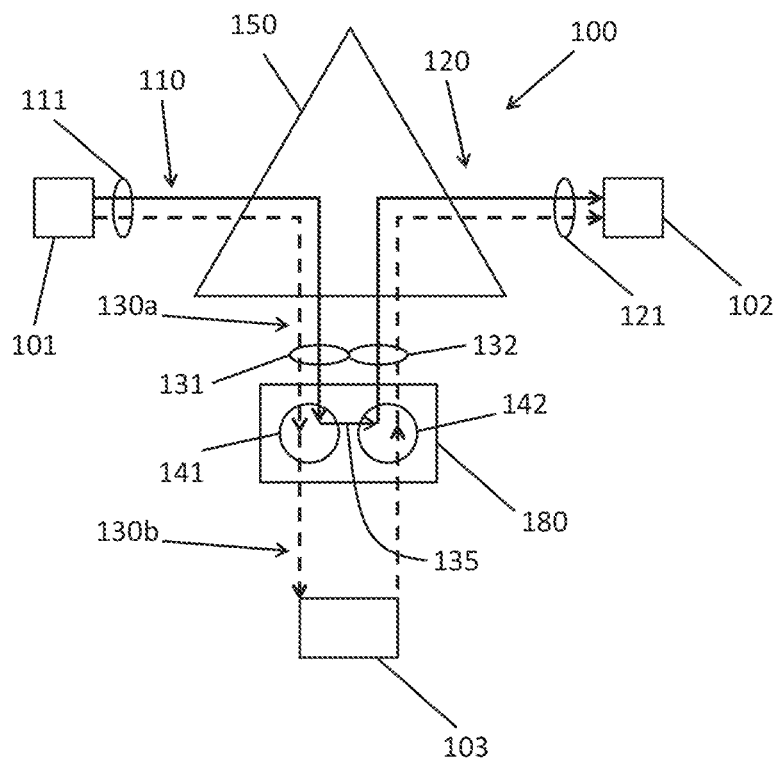
FIG. 4 is a schematic of a branching unit with a remote box comprising an OADM for making a branch connection.

FIGS. 3 and 4 illustrate this approach. In FIG. 3 a fiber-drop branching unit 150 is installed with a box 180, remote between the branching unit 150 and the third location 103 (not shown), so that a proximal portion 130a of the third optical cable links the branching unit 150 and the box 180. A loop connection 135 connects the optical fiber 111 of the first cable 110 to the optical fiber 121 of the second cable 120 via the branching unit 150.

As shown in FIG. 4, at a later time, the box 180 can be picked up, and the desired wavelength selective add/drop filters 141, 142 can be added to divert a preselected range of wavelengths from the proximal portion of the third cable 130a to a distal portion of the third optical cable 130b, so as to provide communication to and from a third location 103. Picking up the submarine box 180, which has only two connections, may be a simpler operation than picking up the branching unit 150, which has a minimum of three.

Figure 5:
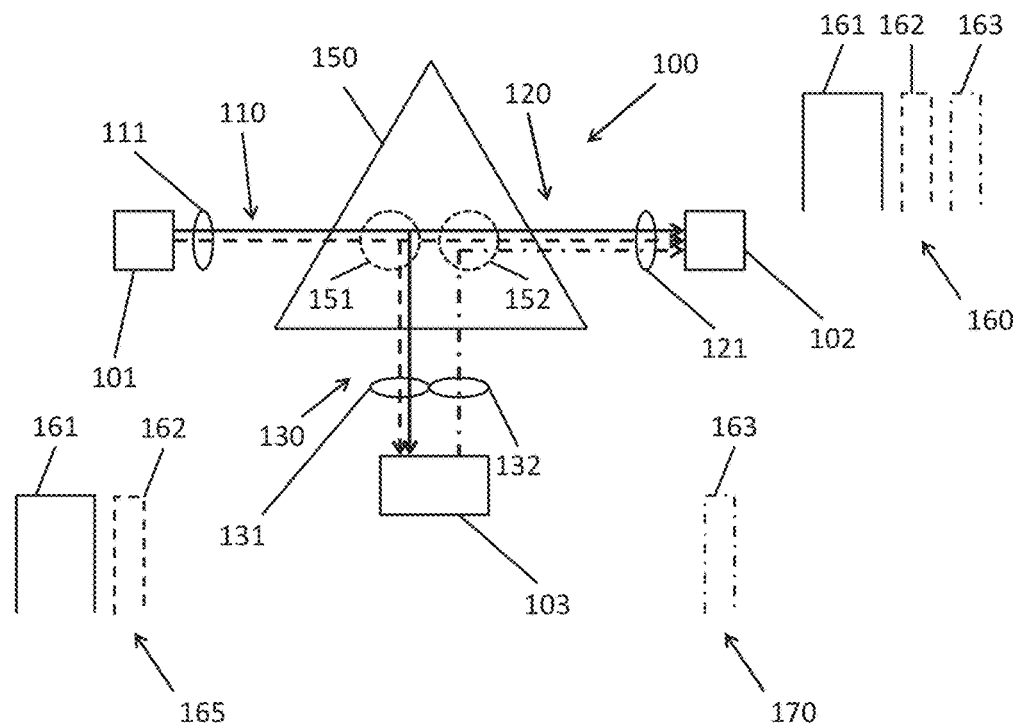
FIG. 5 is a schematic of a broadcast branching unit.

FIG. 5 shows an alternative arrangement, comprising a broadcast branching unit 150. In this approach, a first optical coupler 151 is used to route some of the signal power for all the wavelengths in the optical fiber 111 of the first cable 110 to the optical fiber 131 of the third cable 130. A second optical coupler 152 is used to combine the signals at all wavelengths from the optical fiber 111 of the first optical cable 110 and the optical fiber 132 of the third optical cable 130. This results in the optical fiber 121 of the second optical cable 120 carrying three distinct ranges of wavelengths: a first range 161 for communications from the first location 101 to the second location 102, a second range 162 for communicating from the first location 101 to the third location 103, and a third range 163 for communication from the third location 103 to the second location 102.

Although a broadcast arrangement like that of FIG. 5 provides flexibility in the allocation of spectrum for different routes, when several branches are present the need for each branch to use separate channels/wavelength ranges may lead to inefficient use of spectrum/channels.

Figure 6:
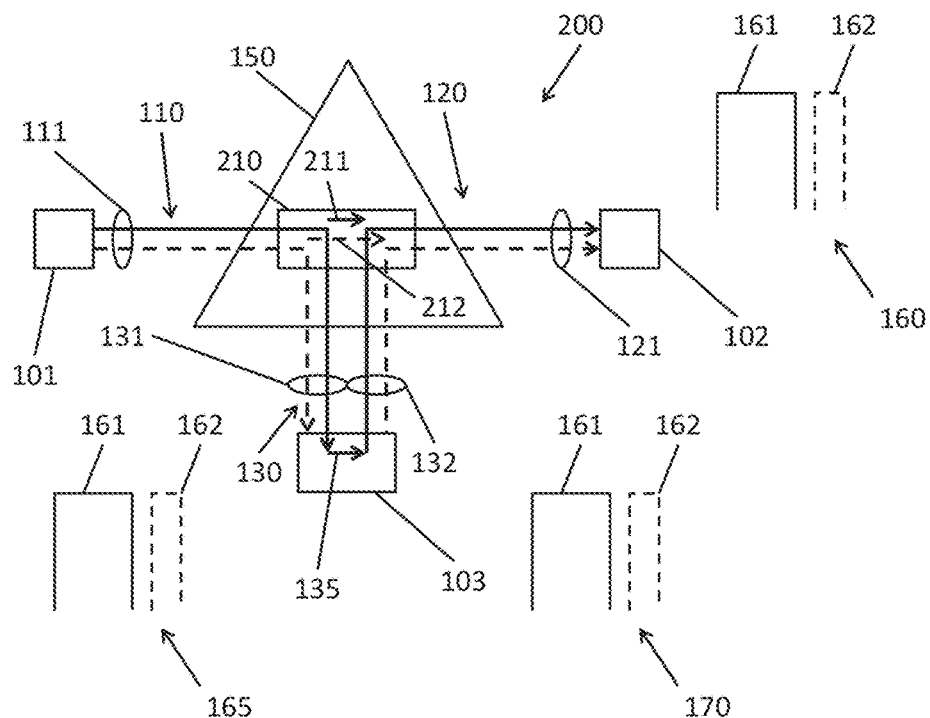
FIG. 6 is a schematic of a fiber drop branching unit according to an embodiment, comprising a switching module in a branch connecting configuration.

FIG. 6 shows an optical communication apparatus 200 according to an embodiment, comprising a fiber drop branching unit 150 connecting a first, second and third optical cable 110, 120, 130. The apparatus is similar to that shown in FIG. 1, with the exception that the branching unit 150 comprises a switching module 210.

In FIG. 6 the switching module 210 is in a branch connecting configuration, so that a branch optical path is provided, routing all the wavelengths 161, 162 input to the branching unit 150 by the optical fiber 111 of the first cable 110 to the optical fiber 131 of the third optical cable 130. A loop connection 135 at the third location 103 passes the first range of wavelengths 161 to the optical fiber 132 of the third optical cable 130. The second range of wavelengths 162 is used for communication to and from the third location 103 via the third optical cable 130.

Figure 7:
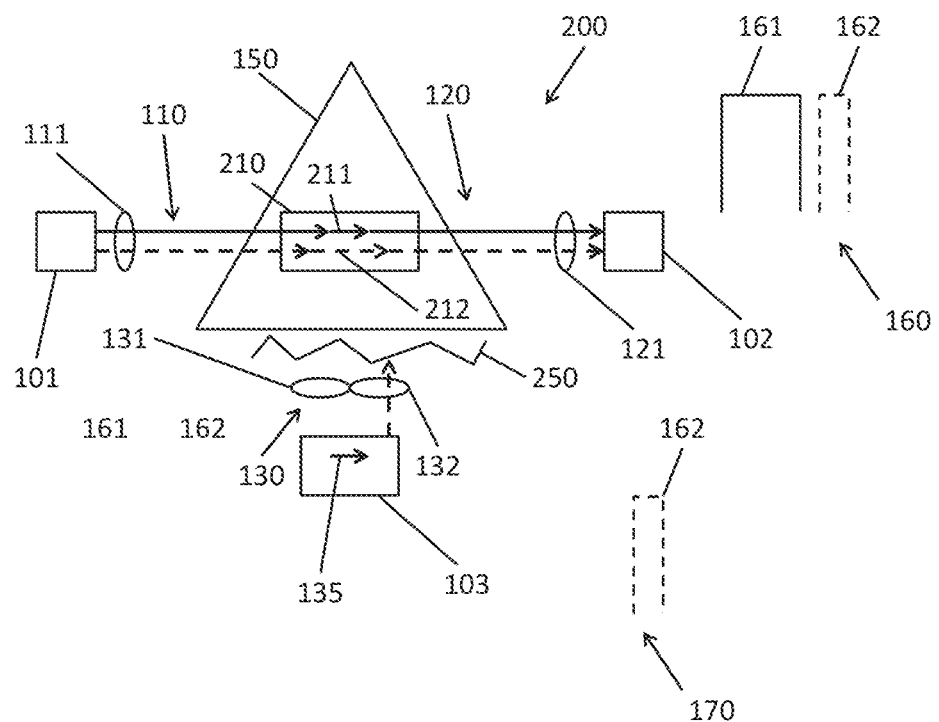
FIG. 7 is a schematic of the fiber drop branching unit of FIG. 6 with the switching module in a bypass configuration.

FIG. 7 shows the arrangement of FIG. 6 with the switching module 210 in a bypass configuration, in which all signal wavelengths 161, 162 input to the branching unit 150 by the optical fiber 111 of the first cable 110 are routed 211, 212 to the optical fiber 121 of the second optical cable 120 without first being routed to the third optical cable 130. This preserves the communication link between the first location 101 and second location 102 in the event of a break 250 in the third optical cable 130, without burdening the system with too much complexity (therefore avoiding cost and reliability issues associated with such complexity).

The switching module 210 may comprise a single optical switch or a pair of optical switches for each optical fiber in the first optical cable 110 (or any other appropriate number of switches). Each optical switch may be a wavelength insensitive optical switch. For example, a 1×2 optical switch may be used to switch between a bypass configuration, in which fiber 111 is coupled to fiber 121, and a branch connecting configuration in which fiber 111 is coupled to fiber 131. The optical switch may be a mechanical (e.g. MEMS) optical switch or a solid state optical switch.

The switching module 210 may be responsive to the break 250 in the third optical cable 130, which will result in an interruption of the optical signal that would ordinarily be received at the branching unit 150 via the fiber 132. The switching module 210 may alternatively (or additionally) be responsive to an interruption of electrical power from the third optical cable 130, as discussed in more detail below.

Figure 8:
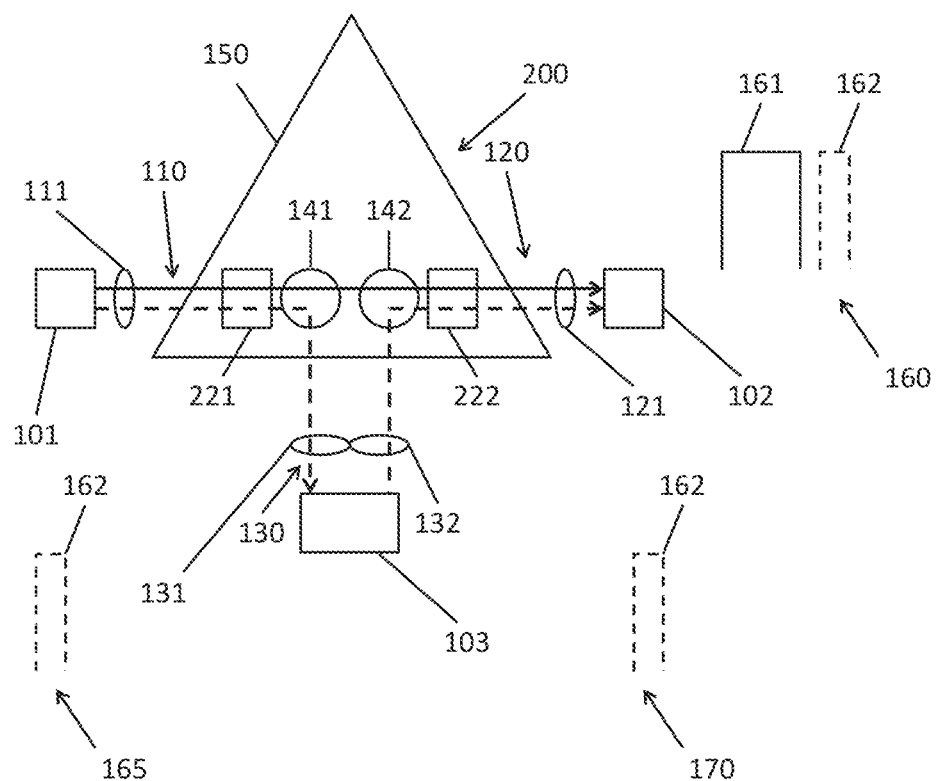
FIG. 8 is a schematic of an OADM branching unit according to an embodiment, comprising a switching module in a branch connecting configuration.
Figure 9:
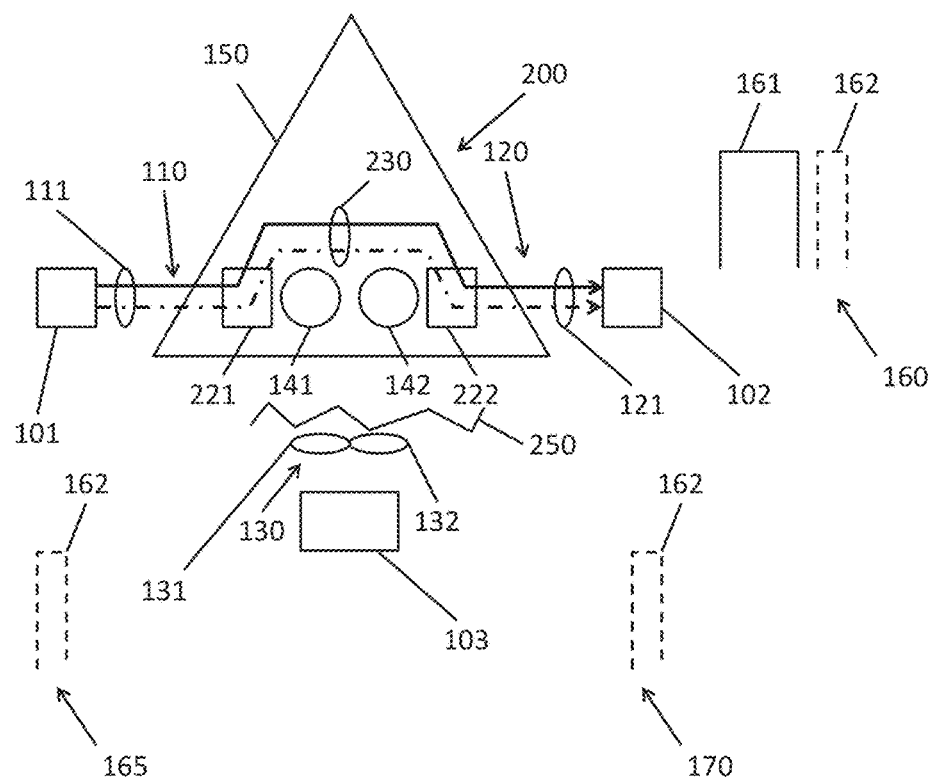
FIG. 9 is a schematic of the OADM branching unit according to FIG. 8 with the switching module in a bypass configuration.

FIGS. 8 and 9 show an alternative embodiment comprising an OADM branching unit 150. The switching module in this embodiment comprises a first optical switch 221 and a second optical switch 222. The first optical switch 221 is disposed between the first cable 110 and the drop filter 141, and the second optical switch 222 is disposed between the add filter 142 and the second optical cable 120. In a branch connection enabling configuration (shown in FIG. 8), the first optical switch routes all wavelengths of light received at the branching unit from the optical fiber 111 of the first optical cable 110 to the optical fiber 131 of the third optical cable. In a bypass configuration, shown in FIG. 9, first optical switch 221 diverts the incoming light 161, 162 via a bypass optical path (e.g. fiber 230) to the second optical switch 222, which routes the light 161, 162 from fiber 230 to the optical fiber 121 of the third optical cable 130.

Figure 10:
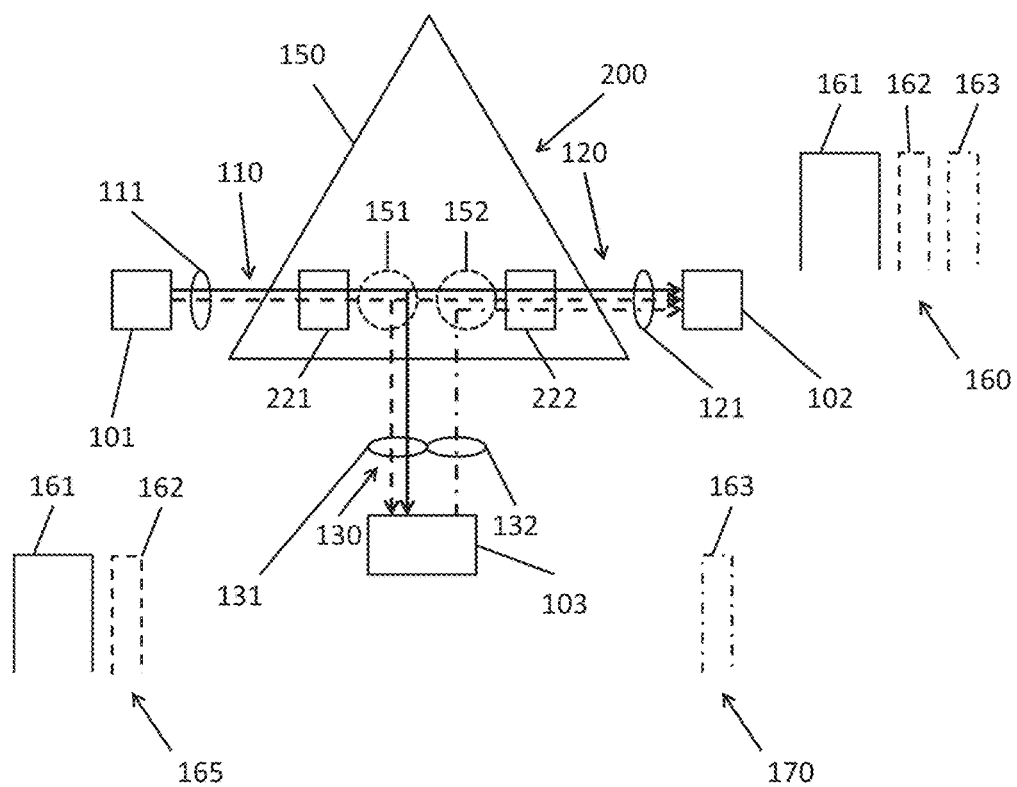
FIG. 10 is a schematic of a broadcast branching unit according to an embodiment, comprising a switching module in a branch connection configuration.

FIG. 10 shows an alternative embodiment, in which the branching unit is similar to that shown in FIG. 5, but in which a switching module is provided for bypassing the branch connections to the third optical cable 130. The switching module is similar to that of the embodiment of FIGS. 8 and 9, and a first switch 221 and second switch 222 are provided. In a branch connection enable configuration (shown in FIG. 10) the first and second switches 221, 222 route all wavelengths of signals input to the branching unit 150 by the optical fiber 111 of the first optical cable 110 to the optical fiber 131 of the third optical cable 130. All the signals from the second optical coupler 152 are routed by the second optical switch to the optical fiber 121 of the second optical cable 120.

Figure 11:
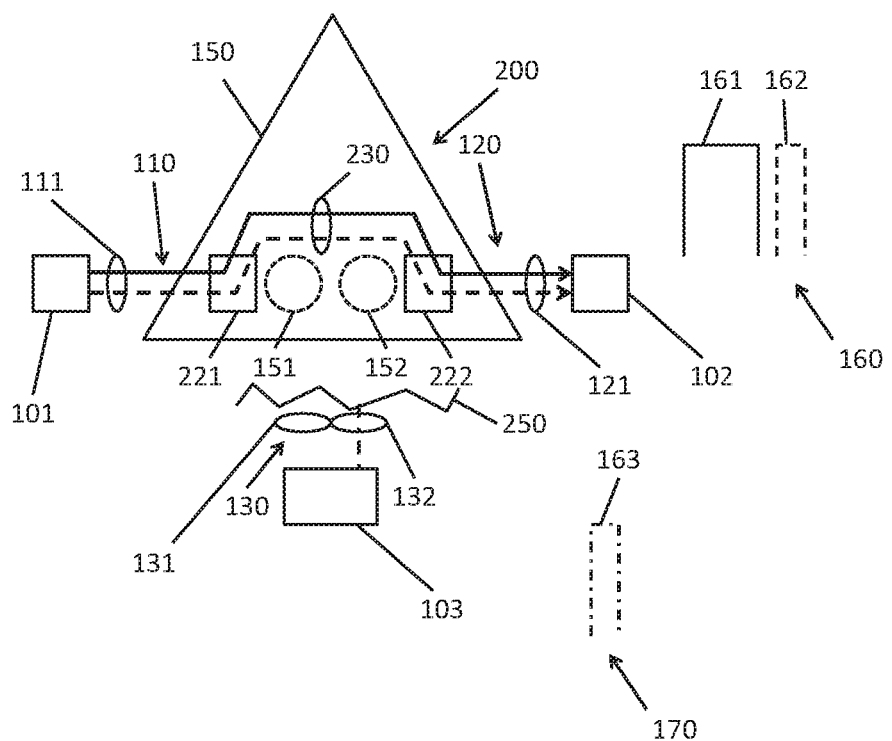
FIG. 11 is a schematic of the broadcast branching unit of FIG. 10, with the switching module in a bypass configuration.

In the bypass configuration, shown in FIG. 11, the first optical switch 221 is configured to route all optical signals from the optical fiber 111 of the first optical cable 110 through the bypass optical path 230, to the second optical switch 222. The second optical switch 222 routes all the signals in the bypass path 230 to the optical fiber 121 of the second optical cable 120.

Figure 12:
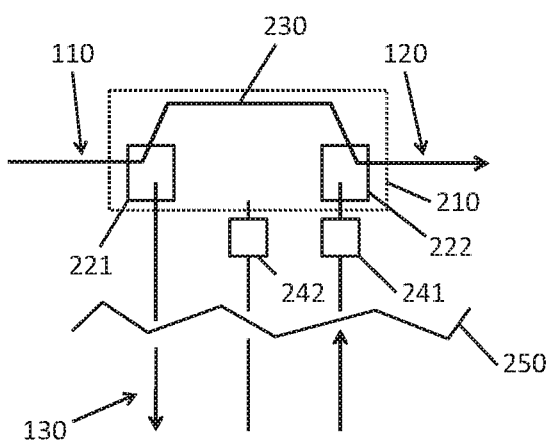
FIG. 12 is a schematic of a switching module for use in an embodiment.

FIG. 12 shows a switching module 210, for use in an embodiment, comprising a first optical switch 221, second optical switch 222, bypass optical path 230, electrical signal detector 242 and optical signal detector 241.

The electrical signal detector 242 may be configured to detect an electrical signal (e.g. power) from the third optical cable 130. The optical signal detector 241 may be configured to detect optical signal power from the third optical cable 130. The absence of an electrical and/or optical signal may indicate a break 250 in the third optical cable 130. The switching module 210 may therefore be responsive to the optical signal detector 241 and/or electrical signal detector 242 to switch into a bypass state (as shown in FIG. 12). The loss of optical signal and/or electrical signal from the third cable 130 may cause the switching module 210 to configure into a bypass state. If either (or both) of an electrical or optical signals are detected by the detectors 241, 242, the switching module 210 may remain in a branch connecting configuration.

An optical signal detector 241 may be particularly appropriate for configurations where the third cable 130 does not include an electrical path, which may be the case if the route from branching unit to the third location 103 (i.e. via the third optical cable 130) does not include any repeaters. The optical detector 241 is also applicable to arrangements in which the third optical cable 130 comprises an electrical power connection, because it provides redundancy.

Figure 13:
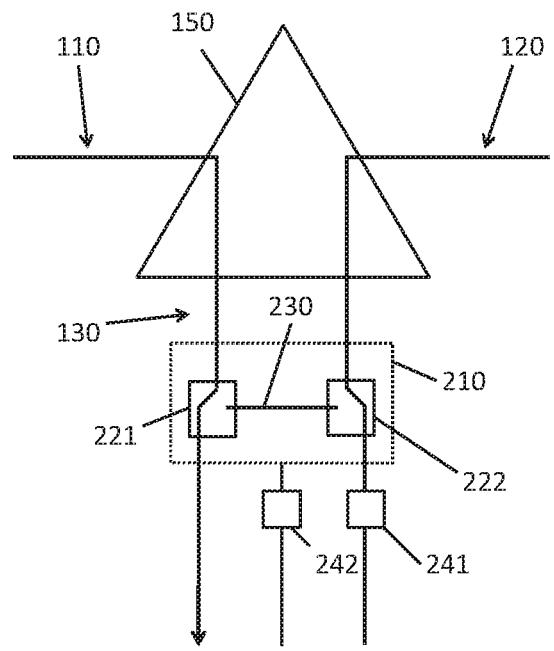
FIG. 13 is a schematic of an optical system according to an embodiment, comprising a fiber drop branching unit and a remote switching module in a branch connection configuration.
Figure 14:
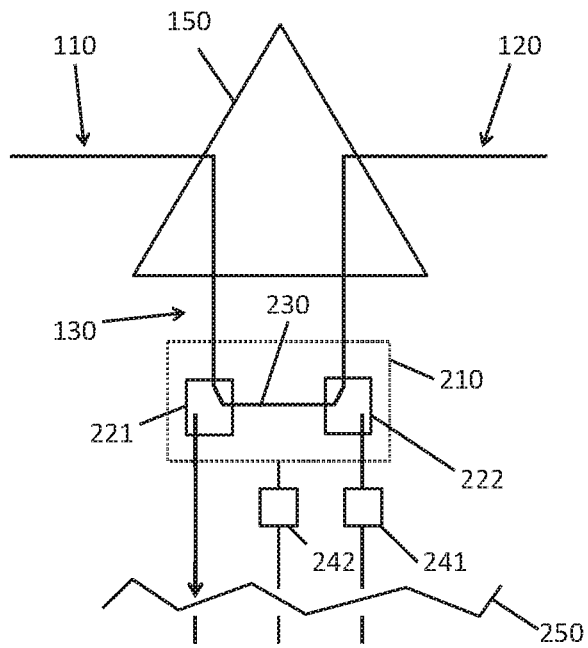
FIG. 14 is a schematic of the optical system of FIG. 13, in which the remote switching module is in a bypass configuration.

FIGS. 13 and 14 show an example of a switching module 210 remote from a fiber drop branching unit 150. For example, the switching module 210 may be within a box 180, as described with reference to FIGS. 3 and 4. The switching module 210 may thereby be operable to provide a bypass optical path for all signals entering the box 180 (and switching module 210) from the optical fiber 131 of the proximal portion 130a of the third cable, so that no signals are routed to the distal portion 130b of the third cable. In a branch connection enable configuration, the switching module 210 may be operable to connect at least some of the optical signals carried by the optical fiber 131 of the proximal portion of the third optical cable 130a to the distal portion of the third optical cable 130b, so that the branch connection to the third location 103 is made.

This bypass configuration may be particularly useful for establishing and testing an optical path between first and second locations (served by first and second optical cables 110, 120).

A further application for embodiments of the present invention is in providing multiple landing points for a submarine cable, the cable at each of the landing points connecting to a single terminating station on shore. The switching module may be used to determine which of two cables is used to land the optical path at the terminating station. Recent statistics show that submarine communication cable damage occurs almost exclusively in shallow water.

According to embodiments, the switching module 210 may be used to divert the entire capacity of an optical cable to a different landing route if a landing cable is damaged. As previously discussed, this could be triggered by monitoring the electrical power feed current (and/or an optical signal).

Figure 15:
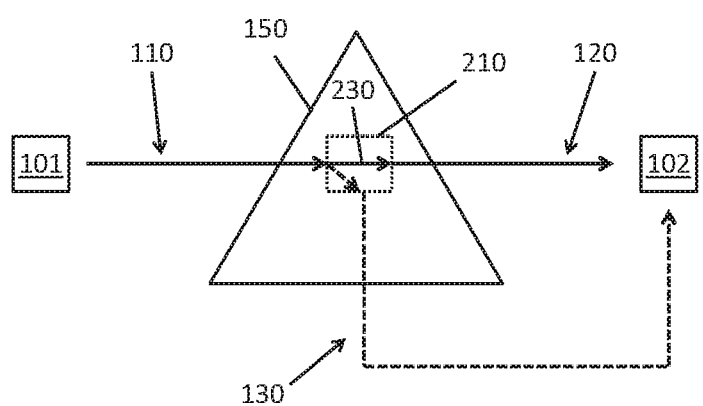
FIG. 15 is a schematic of a branching unit used to divert the entire capacity of an optical cable to a different landing route if a landing cable is damaged.

FIG. 15 illustrates this, showing an optical communications apparatus comprising: a first location 101, second location 102, branching unit 150, and switching module 210. A first optical cable 110 connects the first location 101 to the branching unit 150. The second cable 120 and third cable 130 provide alternative landing cables from the branching unit 150 to the second location 102.

The switching module 210 controls which of the second and third cables 120, 130 are used to land the signal from the first cable 110 at the second location 102. In a first (bypass) configuration, the (branch) connection to the third cable 130 is bypassed, and all the signals entering the branching unit 150 from the first cable 110 are routed to the second location 102 via the second cable 120 (without entering the third cable 130). In a second (branch connecting) configuration, the connection to the second cable 120 is bypassed, and all the signals entering the branching unit from the first cable 110 are routed to the second location 102 via the third cable 120 (without entering the second cable 120).

Although a number of example embodiments have been described, a number of variations and modifications will be apparent, which are intentionally within the scope of the appended claims.

What is claimed is:

1. An optical communications apparatus comprising:
 a branching unit configured to be connected to first, second, and third optical cables, each of the first, second, and third optical cables comprising at least one optical fiber, the branching unit comprising a branch optical path configured to provide a first portion of all signal wavelengths that are input to the branching unit from the at least one optical fiber of the first optical cable to the at least one optical fiber of the third optical cable; and
 a switching module comprising at least one optical switch, the at least one optical switch having:
  a bypass configuration in which a connection via the branch optical path to a distal portion of the third optical cable is bypassed so that all signal wavelengths input to the branching unit from the at least one optical fiber of the first optical cable are routed to the at least one optical fiber of the second optical cable without first being routed through the connection to the distal portion of the third optical cable; and a branch connecting configuration in which the branch optical path is enabled so that the first portion of all signal wavelengths that are input to the branching unit from the at least one optical fiber of the first optical cable is routed to the at least one optical fiber of the third optical cable;

wherein the branching unit further comprises:

a first optical coupler configured to provide the first portion of all signal wavelengths input to the branching unit from the at least one optical fiber of the first optical cable to the branch optical path; and a second optical coupler configured to receive, from the first optical coupler, a second portion of all signal wavelengths input to the branching unit from the at least one optical fiber of the first optical cable;

the second optical coupler also configured to combine (i) the second portion of all signal wavelengths input to the branching unit from the at least one optical fiber of the first optical cable and (ii) signal wavelengths input to the branching unit from the at least one optical fiber of the third optical cable;

the second optical coupler further configured to output the combined signal wavelengths to the at least one optical fiber of the second optical cable.

2. The apparatus of claim 1, wherein:
the branching unit comprises the switching module; and
the at least one optical switch is configure to bypass the entire third optical cable.

3. The apparatus of claim 1, wherein:
the switching module is remote from the branching unit;
a proximal portion of the third optical cable connects the switching module to the branching unit; and
the switching module comprises the connection to the distal portion of the third optical cable.

4. The apparatus of claim 1, wherein each of the at least one optical switch comprises a wavelength-insensitive optical switch.

5. The apparatus of claim 1, wherein the second optical coupler is configured to output three distinct ranges of wavelengths to the at least one optical fiber of the second optical cable, the three distinct ranges of wavelengths comprising:

a first range of wavelengths used for communications between a first location coupled to the first optical cable and a second location coupled to the second optical cable;

a second range of wavelengths used for communications between the first location coupled to the first optical cable and a third location coupled to the third optical cable; and a third range of wavelengths used for communications between the second location coupled to the second optical cable and the third location coupled to the third optical cable.

6. The apparatus of claim 1, wherein the branching unit comprises a broadcast branching unit.

7. The apparatus of claim 1, wherein:
the switching module comprises a bypass optical path; and
the at least one optical switch comprises:
a first optical switch configured to divert signals from the at least one optical fiber of the first optical cable to the bypass optical path; and a second optical switch configured to add signals from the bypass optical path to the at least one optical fiber of the second optical cable.

8. The apparatus of claim 1, wherein:
the switching module comprises an electrical detector configured to detect an electrical signal from the third optical cable; and
the switching module is responsive to the electrical detector.

9. The apparatus of claim 1, wherein:
the switching module comprises an optical detector configured to detect an optical signal from the third optical cable; and
the switching module is responsive to the optical detector.

10. A method comprising:
operating an optical communications apparatus that comprises a branching unit and a switching module, wherein:
the branching unit is configured to be connected to first, second, and third optical cables, each of the first, second, and third optical cables comprising at least one optical fiber, the branching unit comprising a branch optical path configured to provide a first portion of all signal wavelengths that are input to the branching unit from the at least one optical fiber of the first optical cable to the at least one optical fiber of the third optical cable;

the switching module comprises at least one optical switch;

the at least one optical switch has:
a bypass configuration in which a connection via the branch optical path to a distal portion of the third optical cable is bypassed so that all signal wavelengths input to the branching unit from the at least one optical fiber of the first optical cable are routed to the at least one optical fiber of the second optical cable without first being routed through the connection to the distal portion of the third optical cable; and a branch connecting configuration in which the branch optical path is enabled so that the first portion of all signal wavelengths that are input to the branching unit from the at least one optical fiber of the first optical cable is routed to the at least one optical fiber of the third optical cable;

the branching unit further comprises:
a first optical coupler configured to provide the first portion of all signal wavelengths input to the branching unit from the at least one optical fiber of the first optical cable to the branch optical path; and a second optical coupler configured to receive, from the first optical coupler, a second portion of all signal wavelengths input to the branching unit from the at least one optical fiber of the first optical cable;

the second optical coupler also configured to combine (i) the second portion of all signal wavelengths input to the branching unit from the at least one optical fiber of the first optical cable and (ii) signal wavelengths input to the branching unit from the at least one optical fiber of the third optical cable;

the second optical coupler further configured to output the combined signal wavelengths to the at least one optical fiber of the second optical cable; and isolating a portion of a branch connection from the branching unit, wherein the branch connection comprises the third optical cable.

11. The method of claim 10, further comprising:
detecting a break in the distal portion of the third optical cable; and
operating the switching module to bypass the distal portion of the third optical cable.

12. The method of claim 11, wherein operating the switching module to bypass the distal portion of the third optical cable comprises transmitting loading channels from the branch optical path to the at least one optical fiber of the second optical cable.

13. The method of claim 10, wherein:
the branch connection further comprises an add/drop box configured to connect the distal portion of the third optical cable to a proximal portion of the third optical cable; and
the switching module is maintained in the bypass configuration before connecting the distal portion of the third optical cable to the add/drop box.

14. The method of claim 13, further comprising:
changing the configuration of the switching module after connection of the distal portion of the third optical cable so as to connect the distal portion of the third optical cable to the proximal portion of the third optical cable.

15. The method of claim 10, wherein:
the branching unit comprises a submarine branching unit;
the second and third optical cables are configured to provide alternative landings from the branching unit to an on-shore location; and
the switching module is configured to control which of the second and third optical cables is used to land a specified signal received by the branching unit to the on-shore location.

16. A method comprising:
connecting a branching unit to first, second, and third optical cables, each of the first, second, and third optical cables comprising at least one optical fiber, the branching unit comprising a branch optical path configured to provide a first portion of all signal wavelengths that are input to the branching unit from the at least one optical fiber of the first optical cable to the at least one optical fiber of the third optical cable; and
providing a switching module comprising at least one optical switch, the at least one optical switch having:
a bypass configuration in which a connection via the branch optical path to a distal portion of the third optical cable is bypassed so that all signal wavelengths input to the branching unit from the at least one optical fiber of the first optical cable are routed to the at least one optical fiber of the second optical cable without first being routed through the connection to the distal portion of the third optical cable; and
a branch connecting configuration in which the branch optical path is enabled so that the first portion of all signal wavelengths that are input to the branching unit from the at least one optical fiber of the first optical cable is routed to the at least one optical fiber of the third optical cable;
wherein the branching unit further comprises:
a first optical coupler configured to provide the first portion of all signal wavelengths input to the branching unit from the at least one optical fiber of the first optical cable to the branch optical path; and
a second optical coupler configured to receive, from the first optical coupler, a second portion of all signal wavelengths input to the branching unit from the at least one optical fiber of the first optical cable;
the second optical coupler also configured to combine (i) the second portion of all signal wavelengths input to the branching unit from the at least one optical fiber of the first optical cable and (ii) signal wavelengths input to the branching unit from the at least one optical fiber of the third optical cable;
the second optical coupler further configured to output the combined signal wavelengths to the at least one optical fiber of the second optical cable.

17. The method of claim 16, wherein the switching module is configured to operate in the bypass configuration to bypass the distal portion of the third optical cable in response to a break in the distal portion of the third optical cable.

18. The method of claim 17, wherein the switching module is configured to bypass the distal portion of the third optical cable by transmitting loading channels from the branch optical path to the at least one optical fiber of the second optical cable.

19. The method of claim 16, wherein:
a branch connection comprises the third optical cable and an add/drop box configured to connect the distal portion of the third optical cable to a proximal portion of the third optical cable; and
the switching module is configured to be maintained in the bypass configuration before connecting the distal portion of the third optical cable to the add/drop box.

20. The method of claim 19, wherein the switching module is configured to be changed to the branch connecting configuration after connection of the distal portion of the third optical cable so as to connect the distal portion of the third optical cable to the proximal portion of the third optical cable.

21. The method of claim 16, wherein:
the branching unit comprises a submarine branching unit;
the second and third optical cables are configured to provide alternative landings from the branching unit to an on-shore location; and
the switching module is configured to control which of the second and third optical cables is used to land a specified signal received by the branching unit to the on-shore location.

* * * * *